United States Patent [19]

Kasano

[11] Patent Number: 5,142,593
[45] Date of Patent: Aug. 25, 1992

[54] APPARATUS AND METHOD FOR CLASSIFYING FEATURE DATA AT A HIGH SPEED

[75] Inventor: Akira Kasano, Tokyo, Japan

[73] Assignee: Kabushiki Kaisha Toshiba, Kawasaki, Japan

[21] Appl. No.: 696,269

[22] Filed: May 1, 1991

Related U.S. Application Data

[63] Continuation of Ser. No. 478,019, Feb. 9, 1990, abandoned, which is a continuation of Ser. No. 61,310, Jun. 12, 1987, abandoned.

[30] Foreign Application Priority Data

Jun. 16, 1986 [JP] Japan ................................ 61-139816

[51] Int. Cl.$^5$ .............................................. G06K 9/62
[52] U.S. Cl. ......................................... 382/36; 382/18; 382/51
[58] Field of Search .................... 382/1, 18, 36, 39, 51; 358/30, 75; 364/526

[56] References Cited

U.S. PATENT DOCUMENTS

| | | | |
|---|---|---|---|
| 4,177,448 | 12/1979 | Brayton | 382/39 |
| 4,227,177 | 10/1980 | Moshier | 382/39 |
| 4,241,329 | 12/1980 | Bahler et al. | 382/1 |
| 4,555,796 | 11/1985 | Sakoe | 381/43 |
| 4,654,720 | 3/1987 | Tozawa | 358/75 |
| 4,677,465 | 6/1987 | Alkofer | 358/75 |
| 4,718,094 | 1/1988 | Bahl et al. | 381/43 |
| 4,752,957 | 6/1988 | Maeda | 382/36 |

OTHER PUBLICATIONS

August 1986 Image Information (1) "Image Processing Technique on Application of High Speed Image Processor", A. Kasano, pp. 25-32 (translated by PTO).
Partial Translation of "Image Technology & Information Display", (vol. 18, No. 15, Aug., 1986).
Partial Translation of "Image Processing Technique on Application of High-Speed Image Processor" (Jun., 1986).

Primary Examiner—Jose Couso
Attorney, Agent, or Firm—Foley & Lardner

[57] ABSTRACT

In a feature data processing apparatus, one of two designated reference density vectors di and dj, to which a feature vector x corresponding to a feature element is closer, is determined from dij of the equation:

$$dij = (di - dj) \cdot x - (di - dj)/2$$

This value is calculated for all the combinations of two reference feature vectors di and dj selected from a reference feature vector group dk (k=0 to n−1), thereby obtaining classification data. The classification data is determined, using a logical formula or a reference table. An average value of the components is calculated from the classification data and the components of all the feature vectors. The above operation is repeated until the calculated average and the components of the reference density vector converge within a predetermined allowance, thereby precisely classifying feature data.

29 Claims, 9 Drawing Sheets

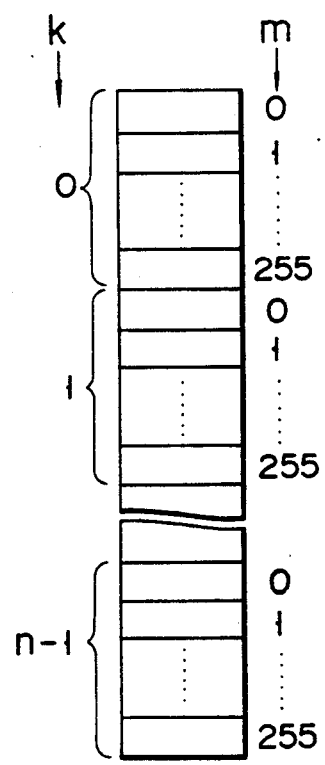
F I G. 3

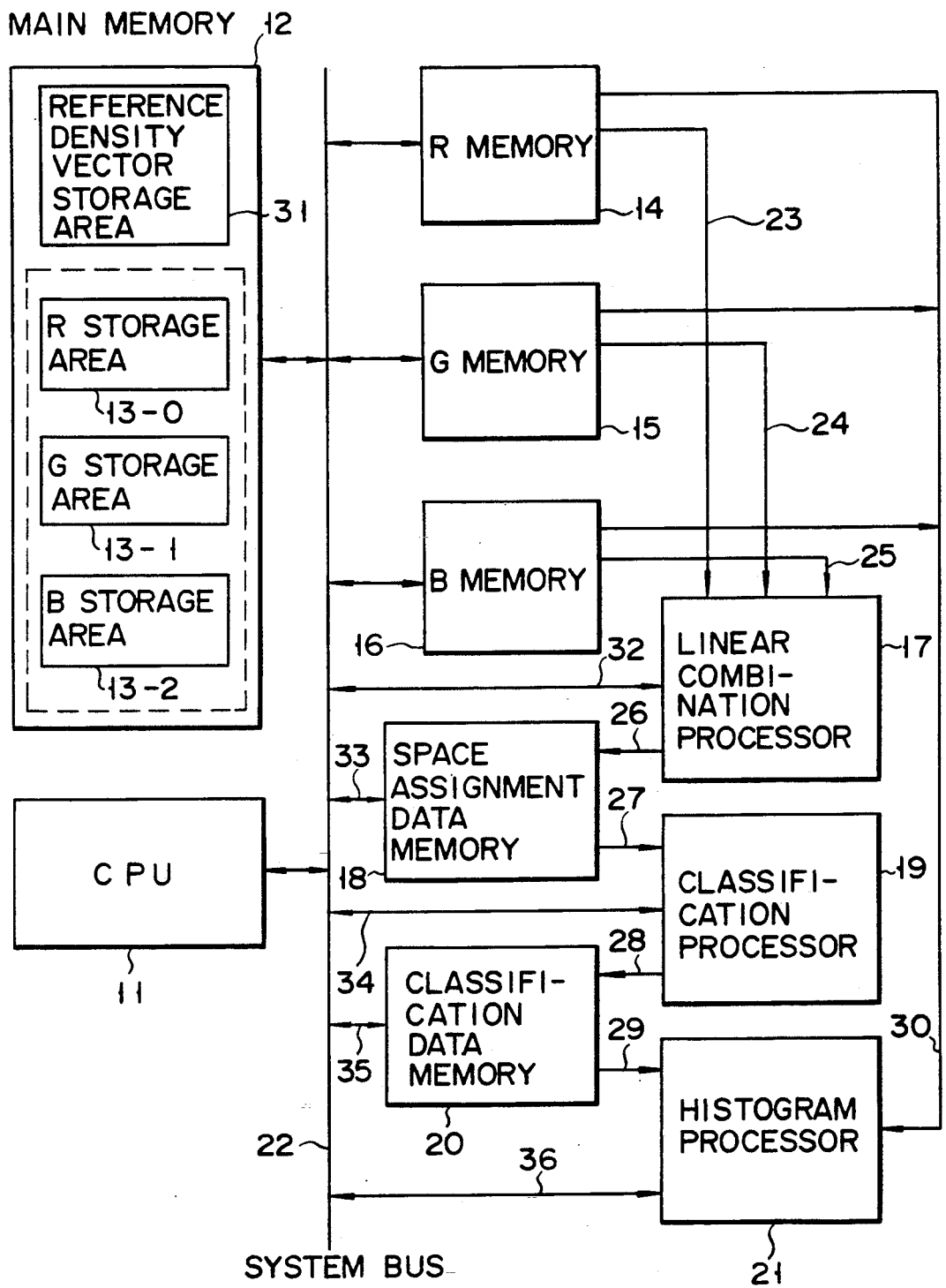
F I G. 2

$$e = \frac{1}{2}i(2n-i-1)+j-i-1$$

| (L01, L02, L12) | SPACE | CLASS |
|---|---|---|
| (0, 0, 0) | $\overline{d2}$ VECTOR | 2 |
| (0, 0, 1) | $\overline{d1}$ VECTOR | 1 |
| (0, 1, 0) | IMPOSSIBLE | 1 |
| (0, 1, 1) | $\overline{d1}$ VECTOR | 1 |
| (1, 0, 0) | $\overline{d2}$ VECTOR | 2 |
| (1, 0, 1) | IMPOSSIBLE | 0 |
| (1, 1, 0) | $\overline{d0}$ VECTOR | 0 |
| (1, 1, 1) | $\overline{d0}$ VECTOR | 0 |

INITIAL STATES OF AVERAGE DENSITY VECTORS

AVERAGE DENSITY VECTORS IN PROCESSING

ULTIMATE AVERAGE DENSITY VECTORS

| (ij) | PREVIOUS CLASS | | | | |
|---|---|---|---|---|---|
| | 0 | 1 | 2 | 3 | 4 |
| L01 | 0/1 | 0/1 | 0/1 | 0/1 | 0/1 |
| L02 | 0/2 | 1/1 | — | — | — |
| L03 | 0/3 | 1/1 | 2/2 | — | — |
| L04 | 0/4 | 1/1 | 2/2 | 3/3 | — |
| L12 | 0/0 | 1/2 | 2/2 | 3/3 | 4/4 |
| L13 | 0/0 | 1/3 | 2/2 | 3/3 | 4/4 |
| L14 | 0/0 | 1/4 | 2/2 | 3/3 | 4/4 |
| L23 | 0/0 | 1/1 | 2/3 | 3/3 | 4/4 |
| L24 | 0/0 | 1/1 | 2/4 | 3/3 | 4/4 |
| L34 | 0/0 | 1/1 | 2/2 | 3/4 | 4/4 |

UPPER : $d_{ij} \geq 0$

LOWER : $d_{ij} < 0$

F I G. 10

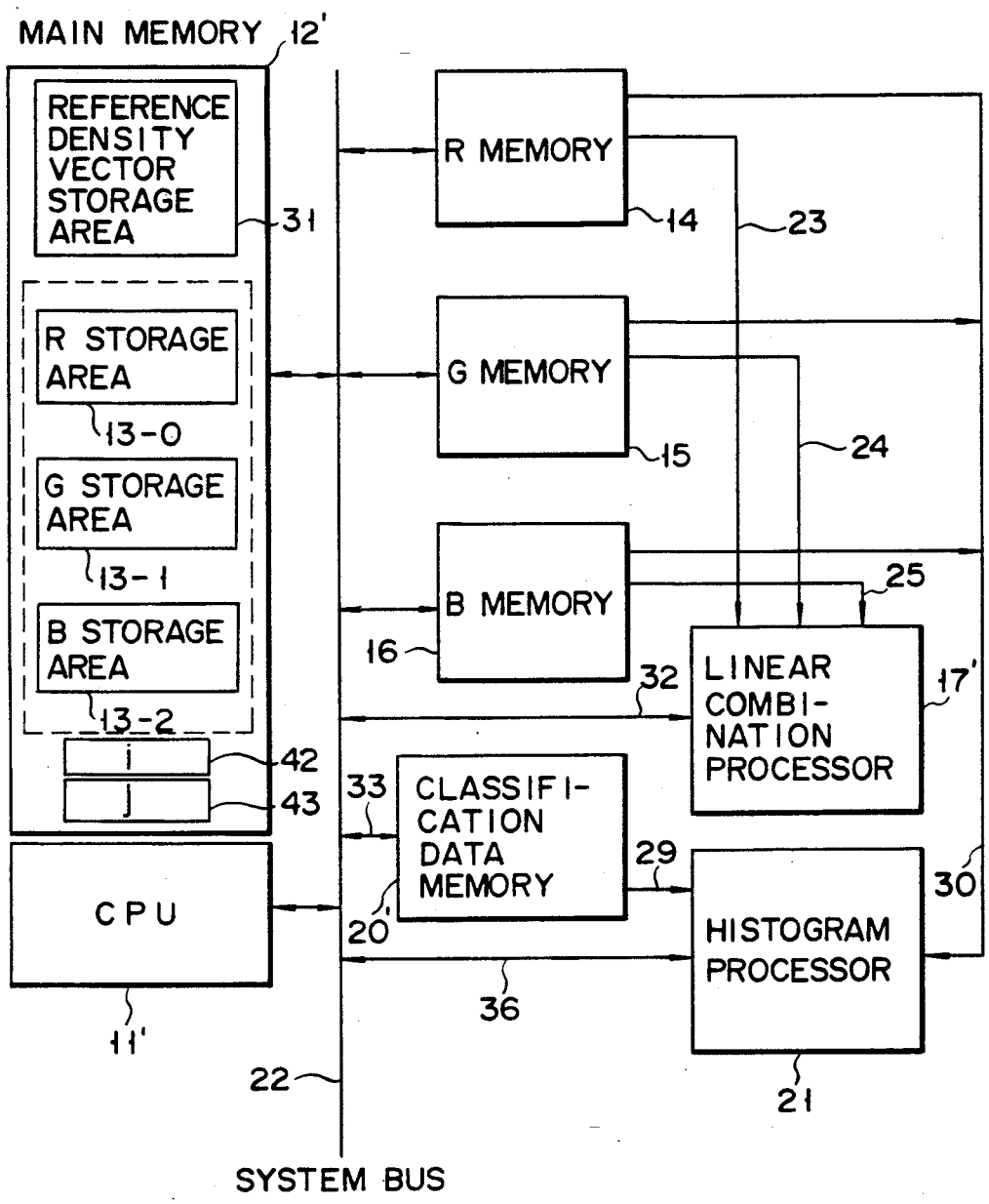
F I G. 11

APPARATUS AND METHOD FOR CLASSIFYING FEATURE DATA AT A HIGH SPEED

This application is a continuation of application Ser. No. 07/478,019, filed Feb. 9, 1990; which is a continuation of application Ser. No. 07/061,310, filed Jun. 12, 1987, now abandoned.

BACKGROUND OF THE INVENTION

The present invention relates to a method for classifying feature data at high speed, in which feature data, for example, color image data are classified into n classes by use of a clustering method, and a feature data processing apparatus embodying the method.

The classification of feature data, for example, color image data input from an ITV camera, a drum scanner, or the like via an A/D converter, into predetermined classes in terms of colors, is a necessary process in a variety of fields of application. If input color image data are projected into a three-dimensional feature space defined by red, green, and blue components, they can often be classified into predetermined classes on the basis of their respective distribution. Known methods for performing such a classification are, for example, a multi-dimensional slice method as shown in FIG. 1A, and a clustering method as shown in FIG. 1B. Note that for the sake of simplicity, FIGS. 1A and 1B show classification states in a two-dimensional space.

Generally, when the multi-dimensional slice method is used, a simple lookup table is prepared for each component of input image data, and colors are classified by referring to this table. Using this method, high-speed processing can be performed. However, since the components of color image data cannot be independently accessed, this classification is influenced by the input condition of image data, and a significant inaccuracy in the classification may occur.

Using the clustering method shown in FIG. 1B, any inaccuracy in the classification can be eliminated, and image data projected in the feature space can be classified. In particular, a method utilizing the K average algorithm is popular, since a better clustering result can be provided. Using the K average algorithm, a distance calculation is performed in order to check n reference density vectors to which density vectors of pixels constituting color image data are closest, in this way classifying the image data. However, when the K average algorithm is used, a large volume of arithmetic operations must be performed, with the result that high-speed processing is not possible.

SUMMARY OF THE INVENTION

The present invention has been developed in consideration of the above situation, and has as its object providing a method for classifying feature data including a plurality of feature elements, each of which can be expressed by a feature vector, into a p-dimensional feature space (p is a positive integer) and is feature-expressed by u-bit data. This method comprises:

obtaining, in combinations for selecting any two reference feature vectors di and dj from reference feature vector groups dk (k=0 to n−1) corresponding to n predetermined reference feature elements, assignment bit data Lij indicating one of reference feature vectors di and dj of each combination to which each feature element is closer for all the feature elements, with respect to all the combinations, thereby generating space assignment data for each feature element, the space assignment data including the assignment bit data corresponding to all the combinations, and generating classification data indicating classes, corresponding to the n reference feature elements, to which each feature element is to be assigned on the basis of the space assignment data.

It is another object of the present invention to provide a method for classifying feature data constituted by a plurality of feature elements each of which can be projected in a p-dimensional feature space (p is a positive integer) as a feature vector, and is feature-expressed as u-bit data. This method comprises:

setting an initial state, in which classification data for designating a class corresponding to a reference feature vector of a reference feature element is cleared, and variables i and j are respectively "0" and "1";

performing classification processing for determining one of reference feature vectors di and dj, to which a feature element of interest is closer, the reference feature vectors being designated by variables i and j (i<j) from reference feature vector groups dk (k=0 to n−1) corresponding to n predetermined reference feature elements, and updating variables i and j and the classification data in accordance with a result of the classification processing, performing the classification processing repeatedly with respect to the reference feature vectors, based on the updated variables i and j, thereby determining the class to which feature element of interest is to be assigned, in accordance with the classification data, when variable j becomes equal to n−1; and repetitively executing the setting of the initial state and the determining of the class for all the feature elements.

It is still another object of the present invention to provide a feature data processing apparatus for classifying feature data constituted by a plurality of feature elements, each of which can be projected in a p-dimensional feature space (p is a positive integer) as a feature vector and are feature-expressed by u-bit data. The apparatus comprises:

first memory means, for storing respective components of feature vectors corresponding to a plurality of feature elements to be classified;

second memory means, for storing respective components of reference feature vector groups dk (k=0 to n−1) corresponding to n predetermined reference feature elements;

space assignment data generating means for obtaining assignment bit data Lij, which indicates one of two reference feature vectors di and dj to which a feature vector of interest x is closer with respect to combinations of the two reference feature vectors di and dj, from reference feature vector groups dk, thereby generating space assignment data for each feature element, the space assignment data including assignment bit data Lij corresponding to all the combinations for each feature element; and classification means for generating, on the basis of the corresponding space assignment data, classification data indicating classes corresponding to the n reference feature elements to which a feature element of interest is to be assigned.

It is still another object of the present invention to provide a feature data processing apparatus for classifying feature data constituted by a plurality of feature elements each of which can be mapped in a p-dimensional feature space (p is a positive integer) as a feature vector and are feature-expressed by u-bit data. The apparatus comprises:

first memory means, for storing respective components of feature vectors corresponding to a plurality of feature elements to be classified;

second memory means, for storing respective components of reference feature vector groups dk (k=0 to n−1) corresponding to n predetermined reference feature elements, and variables i and j;

classification data storage means for storing classification data for designating a class corresponding to a reference density vector of a reference feature element;

setting means for clearing the classification data of the classification data storage means and initially setting variables i and j to be "0" and "1, respectively; and classification data updating means for performing classification processing for determining one of two reference density vectors di and dj, designated by variables i and j (i<j) from the second memory means, to which a feature vector of interest is closer, updating variables i and j and the classification data in accordance with the determination result, performing the classification processing repeatedly, based on the updated variables i and j, and determining a class to which the feature element is to be assigned, in accordance with the classification data, when variable j becomes equal to n−1.

According to the present invention as described above, the volume of calculations can be reduced considerably as compared with that required during conventional clustering processing. As a result, feature data classification processing can be performed at high speed. In addition, the number of classes can be arbitrarily selected. Since the classification processing is performed in accordance with the distribution of color image data, as the feature data in an RGB feature space, highly accurate classification processing, uninfluenced by the prevailing input conditions of color image data, can be performed. Since a linear combination processor, a histogram processor, a data conversion processor, and the like can be realized by a conventional hardware module of an image data processor apparatus, a special-purpose hardware arrangement is therefore not necessary.

BRIEF DESCRIPTION OF THE DRAWINGS

FIGS. 1A and 1B are views for explaining conventional classification processing methods, in which FIG. 1A shows a multi-dimensional slice method, and FIG. 1B shows a clustering method;

FIG. 2 is a block diagram showing an image data processing apparatus according to an embodiment of the present invention;

FIG. 3 is a memory map showing in detail a storage area of a main memory, shown in FIG. 2, for storing classified image data;

FIG. 10 is a view for explaining the operation of a second embodiment;

FIG. 11 is a block diagram showing an arrangement of a third embodiment; and

DETAILED DESCRIPTION OF THE PREFERRED EMBODIMENTS

Figure 1A:
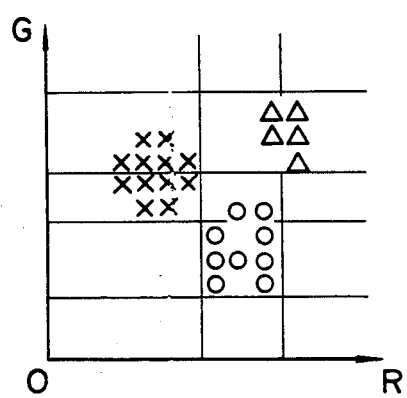
Figure 1B:
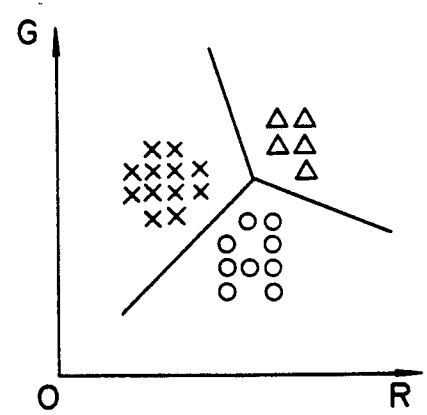

An image data processing apparatus as a feature data processing apparatus according to an embodiment of the present invention will now be described, with reference to the accompanying drawings.

An arrangement of the embodiment will first be described with reference to FIG. 2.

Referring to FIG. 2, CPU 11 connected to system bus 22 controls the whole apparatus and performs necessary arithmetic operations. Main memory 12 connected to system bus 22 has three storage areas 13-0 to 13-2, respectively corresponding to R (red), G (green) and B (blue) components of image data as feature data, for storing operation results of histogram processor 21 (to be described later), and reference density vector storage area 31 for storing R, G, and B components of each of the groups or sets dk (k=0 to n−1) of n reference density vectors. Each of storage areas 13-0 to 13-2 is divided into n blocks from 0th to (n−1) th blocks as shown in FIG. 3. The number of entries for each block is $2^8$, i.e., 256 since color image data in which each of R, G, and B components of its density data is represented by 8-bit data is processed in this embodiment.

R, G, and B memories 14, 15, and 16 are connected to system bus 22. Memories 14 to 16 respectively store R (red), G (green), and B (blue) components, as feature elements, of density data of each pixel of color image data which is input through, e.g., an A/D converter. The components of each pixel are represented by 8-bit data, and are stored at an identical address of memories 14 to 16. Therefore, R, G, and B components of the pixel can be read out at the same time. In this manner, each pixel can be represented by vectors in accordance with color components of each density data. Memories 14 to 16 are connected to linear combination processor 17 respectively through lines 23 to 25, and are also connected to histogram processor 21 through line 30.

Linear combination processor 17 connected to system bus 22 through line 32 performs a linear combination operation between density vectors x having components simultaneously read out from memories 14 to 16 and two reference density vectors di and dj (i<j) selected from sets dk of n reference density vectors stored in storage area 31 of main memory 12. The linear combination operation results are written into space assignment data memory 18 through line 26 as assignment bit data.

Space assignment data memory 18 connected to system bus 22 through line 33 stores the assignment bit data from processor 17 at an address determined by two reference density vectors di and dj of space assignment data for the corresponding pixel. Therefore, when an RGB space is equally divided by an equidistant plane of di and dj (where i<j) arbitrarily selected from sets of n reference density vectors, if assignment bit data indicating whether density vector x of the corresponding pixel in the RGB feature space belongs to a di-side space or a dj-side space is given as Lij, individual space assignment data can be generated by combining data Lij in a predetermined order for all the combinations of di and dj.

Classification processor 19 connected to system bus 22 through line 34 sequentially reads out space assignment data for each pixel from memory 18 through line 27, and generates classification data k indicating one of n classes k (k=0, 1, ..., n−1) to which the corresponding pixel belongs. Generated classification data k is stored in classification data memory 20 through line 28. Memory 20 is connected to system bus 22 through line 35.

Histogram processor 21 connected to system bus 22 through line 36 performs a histogram operation for the components of density data of each pixel read out from memories 14 to 16 in accordance with the classification data stored in memory 20. The histogram operation results are stored in corresponding areas of storage areas 13-0 to 13-2 of main memory 12 through line 36.

Figure 4A:
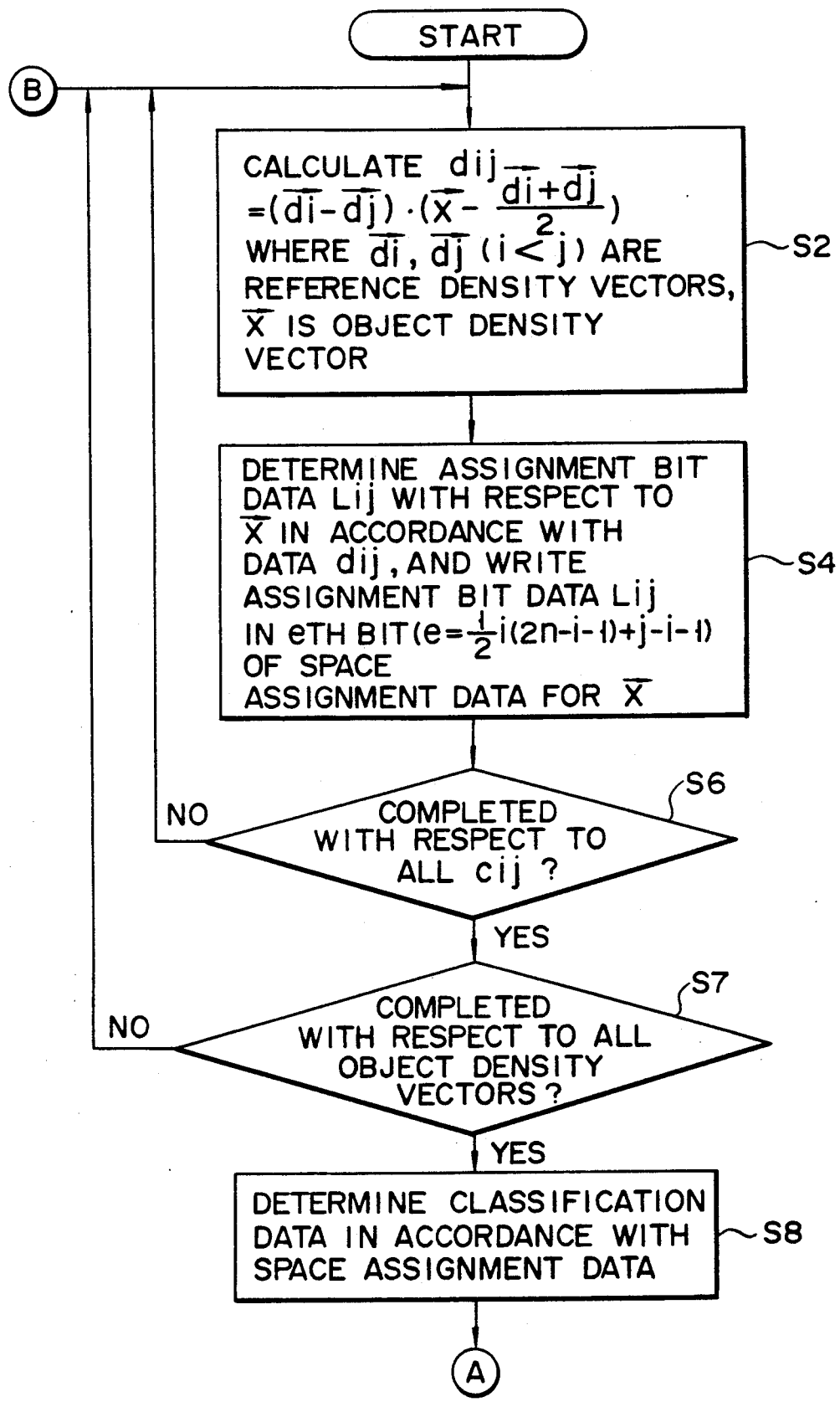
FIGS. 4A and 4B are flow charts for explaining the operation of the image data processing apparatus according to the above embodiment of the present invention.
Figure 4B:
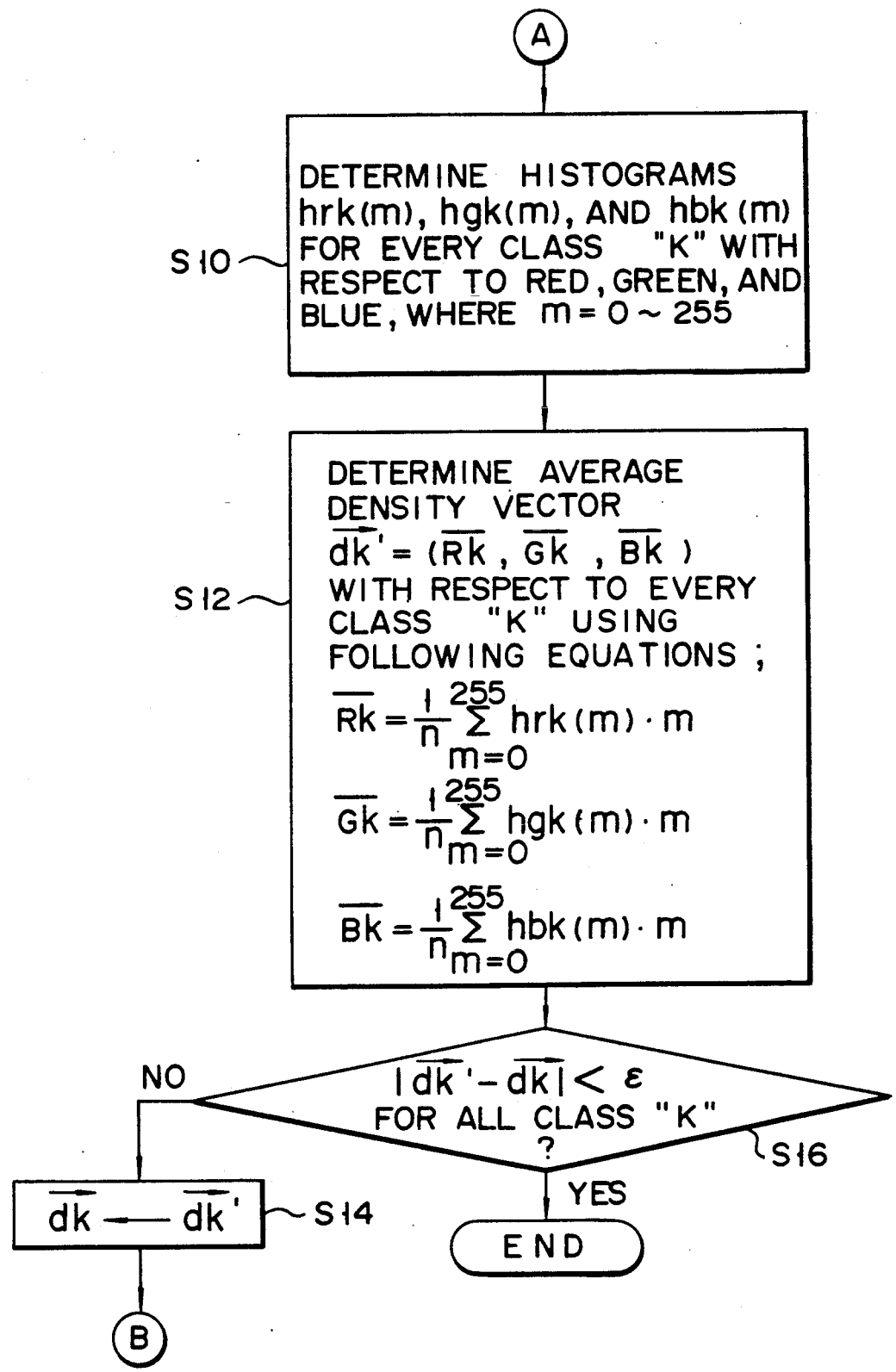
Figure 5:
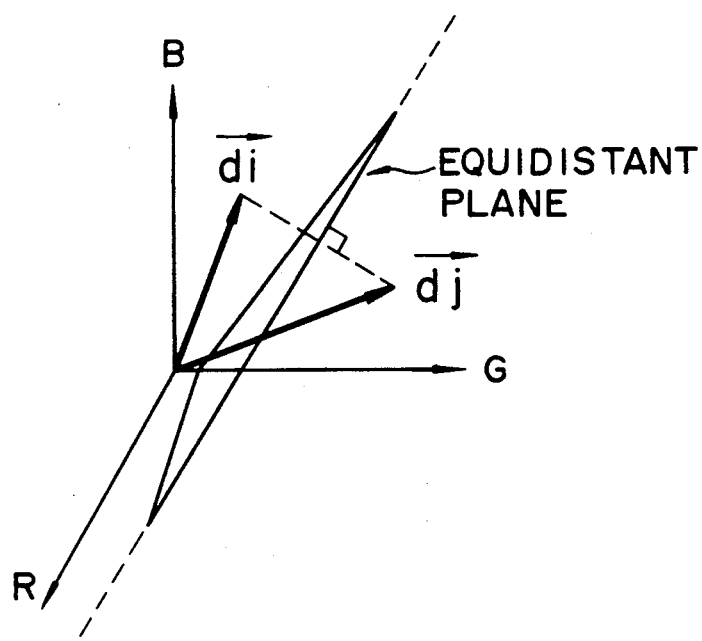
FIG. 5 is a view for explaining processing which is performed to determine a class from a reference density vector for a reference pixel.

The operation of the embodiment having the arrangement shown in FIG. 2 will be described with reference to the flow charts shown in FIGS. 4A and 4B.

Assume that sets dk (k=1 to n−1) of n reference density vectors are set in advance by a pointing device such as a mouse, and R, G, and B components of each preset reference density vector are stored in storage area 31. The reference density vector can be available by a means other than a man-machine interface such as a pointing device, e.g., a program. Processing for classifying pixels of input color image data into n classes corresponding in number to the sets of reference density vectors will now be described.

In step S2, CPU 11 performs control operations for determining RGB feature spaces, divided by an equidistant plane defined by two reference density vectors di and dj (where i<j) arbitrarily selected from sets dk (k=1 to n−1) of n reference density vectors, to which density vector x of a pixel of interest belongs, i.e., determining di and dj to which density vector x is closer, in accordance with an input classification command. For this purpose, a space division command is output to linear combination processor 17. A vector representing the equidistant plane associated with vectors di and dj is given as xe, vector xe satisfies following equation (1):

$$(di - dj) \cdot [xe - \{(di + dj)/2\}] = 0 \quad (1)$$

In order to determine a partial space in which density vector x of the pixel of interest is present, the identical addresses of memories 14 to 16 are read-accessed, and density vector x=(xR, xG, xB) of the corresponding pixel is read out therefrom. Readout density vector x is sent to processor 17 through lines 23 to 25. Two reference density vectors di=(ri, gi, bi) and dj=(rj, gj, bj) (where i<j) are read out from storage area 31 of memory 12 so as to calculate coefficients (ri−rj), (gi−gj), and (bi−bj) and bias ($|di|^2 - |dj|^2$). The calculation results are supplied to processor 17 through line 32.

Processor 17 calculates value dij of equation (2) by utilizing equation (1):

$$dij = (ri - rj) \cdot xR + (gi - gj) \cdot xG + (bi - bj) \cdot xB - (|di|^2 - |dj|^2) \quad (2)$$

After linear combination operation result dij of equation (2) is calculated, processor 17 checks if the operation result is a positive value, "0", or a negative value. If the operation result is a positive value or "0", processor 17 determines that density vector x of the corresponding pixel belongs to the di-side space, and generates assignment bit data Lij of logic "1". If the operation result is a negative value, processor 17 determines that density vector x belongs to the dj-side space and generates assignment bit data Lij of logic "0".

Figure 6:
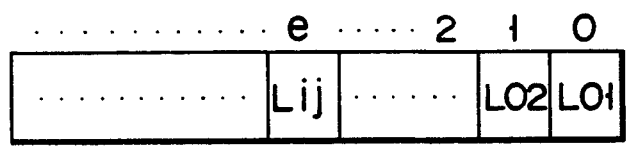
FIG. 6 is a data format showing space assignment data representing an assignment state of pixels of input image data to classes.

In step S4, processor 17 writes generated assignment bit data Lij in an eth bit of space assignment data for pixel x in space assignment data memory 18 through line 26, as shown in FIG. 6. The value of e is defined by following equation (3):

$$e = i[(n-1) + (n-i)]/2 + j - i - 1 \quad (3)$$
$$= i(2n - i - 1)/2 + j - i - 1$$

where $0 \leq i \leq n-1$, $0 \leq j \leq n-1$, $i<j$, n is the number of reference density vectors.

Therefore, as shown in FIG. 6, when d0 and d1 are respectively adopted as di and dj, assignment bit data L01 is set at the 0th bit. When d0 and d2 are adopted, assignment bit data L02 is set at the 1st bit.

After the operations of steps S2 and S4 are completed, completion of the operation processing and the determination processing is checked in step S6 for all the combinations of di and dj (where i<j). Combinations of arbitrary di and dj from n reference density vectors (where i<j) are n(n−1)/2 in number. Therefore, if No (N) in step S6, processor 17 repeats the operations of steps S2 and S4. Since processor 17 is restarted at this time, a space division command is output again.

If Yes (Y) in step S6, step S7 is executed. Step S7 checks if the operation processing and the determination processing are completed for all the pixels stored in memories 14 to 16. If N in step S7, steps S2 to S6 are repeated. If Y in step S7, step S8 is executed. When Y is obtained in step S7, n(n−1)/2 assignment bit data Lij are written in space assignment data for each pixel in memory 18.

In step S8, a data conversion command is output to classification processor 19 so as to cause it to determine classes to which pixels belong. In accordance with this command, processor 19 reads out space assignment data from memory 18 through line 27, and generates, based on the readout space assignment data, classification data k which indicates one of n classes to which the corresponding pixel belongs. Generated classification data k is stored in memory 20 through line 28. The above processing is executed for all the space assignment data stored in memory 18.

Figure 7:
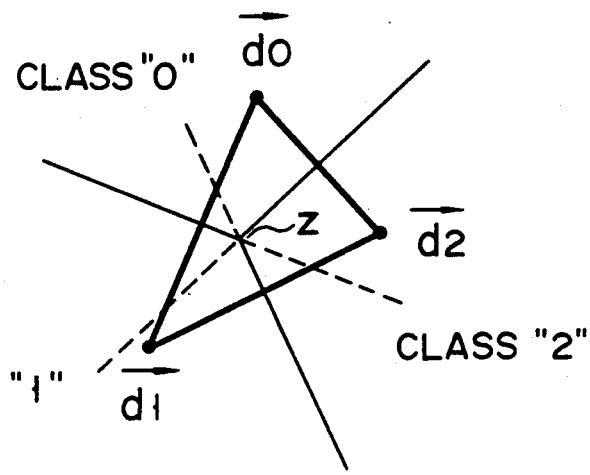
FIG. 7 is a view showing an assignment state of pixels to classes.
Figures 8, 9A, 9B, 9C:
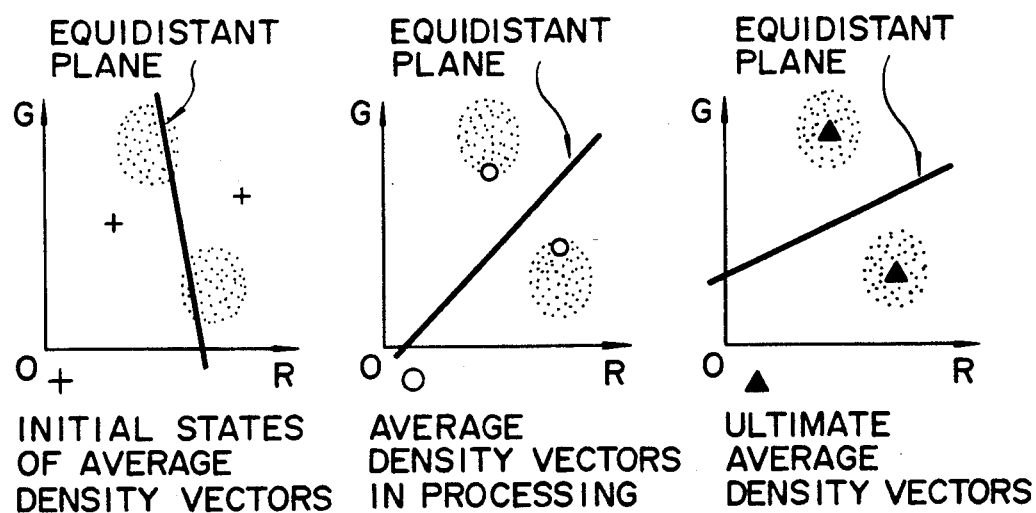
FIG. 8 is a data format showing space assignment data and classification data in the assignment state shown in FIG. 7.
FIGS. 9A to 9C are views for explaining classification by use of a clustering method according to the present invention.

Classification data generation by processor 19 will be described with reference to a case wherein n=3, i.e., the RGB feature space is divided into class 0 to class 2, as shown in FIG. 7. If n=3, the number of assignment bit data in space assignment data is 3·2/2=3, and the bit data consists of bit data L01, L02, and L12 from the 0th bit. The bit state of (L01, L02, L12) has $2^3 = 8$ combinations, as shown in FIG. 8, and indicates the side of space indicated by reference density vectors d0, d1, and d2 specifying class 0, class 1, and class 2 to which the corresponding pixel belongs. Data belonging to class "0" is L01·L02=1, data belonging to class "1" is L01·L12=1, and data belonging to class "2" is L02·L12=1. However, in this case, in the cases of (0, 1, 0) and (1, 0, 1), impossible solutions are yielded. The impossible solutions can be omitted. And an infinite solution is yielded at point z. In this embodiment, data are determined in an order from L01, so that (1, 0, 1) belongs to class "0", and (0, 1, 0) belongs to class "1". As can be seen from the above description, when the operation of step S8 by processor 19 is completed, the classification results of color image data are stored in classification data memory 20 in units of pixels.

In this embodiment, pixels on the RGB feature space are classified using equidistant planes defined by combinations of two reference density vectors di and dj (where i<j) selected from sets dk (k=0 to n−1) of n reference density vectors, and the operation for detecting the side of space of reference density vectors di and dj to which each pixel belongs is performed for all the combinations of di and dj, i.e., is repeated n(n−1)/2 times. The detection operation can be uniquely performed based on the linear combination operation results of equation (2) unlike a conventional case wherein distances to all the reference density vectors are calculated. Therefore, class classification can be performed at high speed.

When processor 19 completes the operation of step S8, the completion of the operation is signaled to CPU 11 via system bus 22. CPU 11 enables histogram processor 21 via system bus 22. Processor 21 accesses R memory 14 and classification data memory 20 at the same time in units of pixels, and executes a histogram operation coupling data of classification data k from memory 20 and density data of an R component from R memory 14, thereby obtaining histogram hrk(m) indicating the number of pixels in which the density data of the R component of a pixel group belonging to class k (k=0, 1, ..., n−1) is m (m=0, 1, ..., 255). Histogram hrk(m) is transferred to memory 12 through system bus 22, and is stored as an mth entry of a kth class in area 13-0 of three storage areas 13-0 to 13-2. When processor 21 completes the histogram operation for R memory 14 and memory 20, it then performs the histogram operation for G and B memories 15 and 16 in the same manner as for R memory 14. Thus, histograms hgk(m) and hbk(m) for G and B components are obtained.

After all the histogram operations of processor 21 are completed, CPU 11 calculates the following equations using histograms hrk(m), hgk(m), and hbk(m) respectively stored in three storage areas 13-0 to 13-2 of memory 12 in order to obtain average density vector dk'=($\overline{Rk}$, $\overline{Gk}$, $\overline{Bk}$) for each class k:

$$Rk = (1/n) \sum_{m=0}^{255} hrk(m) \cdot m \quad (4)$$

$$Gk = (1/n) \sum_{m=0}^{255} hgk(m) \cdot m$$

$$Bk = (1/n) \sum_{m=0}^{255} hbk(m) \cdot m$$

where n indicates the number of pixels belonging to class k.

After CPU 11 calculates average density vector dk'=($\overline{Rk}$, $\overline{Gk}$, $\overline{Bk}$) for each class k in step S12, it is checked in step S16 if dk' is equal to dk within the range of a predetermined allowance ε for all the classes k. If one falling outside the range is found, CPU 11 substitutes dk with dk' obtained in step S12, and restarts linear combination processor 17. The above operations are repeated, and when dk' for all the k falls within the range of the predetermined allowance ε, area division processing is completed.

FIGS. 9A to 9C show the above states. FIG. 9A shows a state wherein two reference density vectors indicated by mark "+" are arbitrarily given, and an image is equally divided by the equidistant plane of the two reference density vectors. FIG. 9B shows a state wherein the image is equally divided again by the equidistant plane of the average density vectors of the two areas divided by the equidistant plane shown in FIG. 9A. FIG. 9C shows a state of an ultimate cluster wherein the average density vectors (indicated by mark " ") of the two areas equally divided by the equidistant plane shown in FIG. 9B coincide with average density vectors of two areas obtained by again equally dividing the image by the equidistant plane of the former two vectors.

A second embodiment will now be described. The arrangement is as shown in FIG. 2. The generation method of classification data by classification processor 19 is different from that of the first embodiment.

In the second embodiment, classification is made using data shown in FIG. 10. In this embodiment, five reference density data are used. An upper portion of a table shown in FIG. 10 shows classes when Lij="1" or dij≧0 and a lower portion thereof shows classes when Lij="0" or dij<0. First, assignment bit data L01 for a set of reference density vectors d0 and d1 is checked. In accordance with the checked result, if L01 is "1", "0" is selected from the column. If L01 is "0", "1" is selected therefrom. If L01 is "1", L02 is checked in turn. If L01 is "0", L12 is checked in turn, and the class is determined as a class indicated in a column at the intersection of column "1" and row "L12". If L12 is "0", the class is given as "2". Then, L23 is checked. A lookup table based on the above principle is prepared in classification processor 19, and space assignment data can be classified at high speed. Other operations of the second embodiment are the same as those in the first embodiment.

A third embodiment will now be described.

FIG. 11 shows the arrangement of the third embodiment. Main memory 12' has the same structure as that of main memory 12 except that it also has i register 42 and j register 43. Linear combination processor 17' has the same structure as that of processor 17, except that after value dij is calculated, it does not write assignment bit data in space assignment data but signals to CPU 11' whether value dij is a positive or negative value. Classification data in classification data memory 20' is updated by CPU 11' in accordance with the operation result of processor 17'. Therefore, the third embodiment has an arrangement in which space assignment data memory 18 and classification processor 19 are omitted from the arrangement of the first embodiment.

Figure 12:
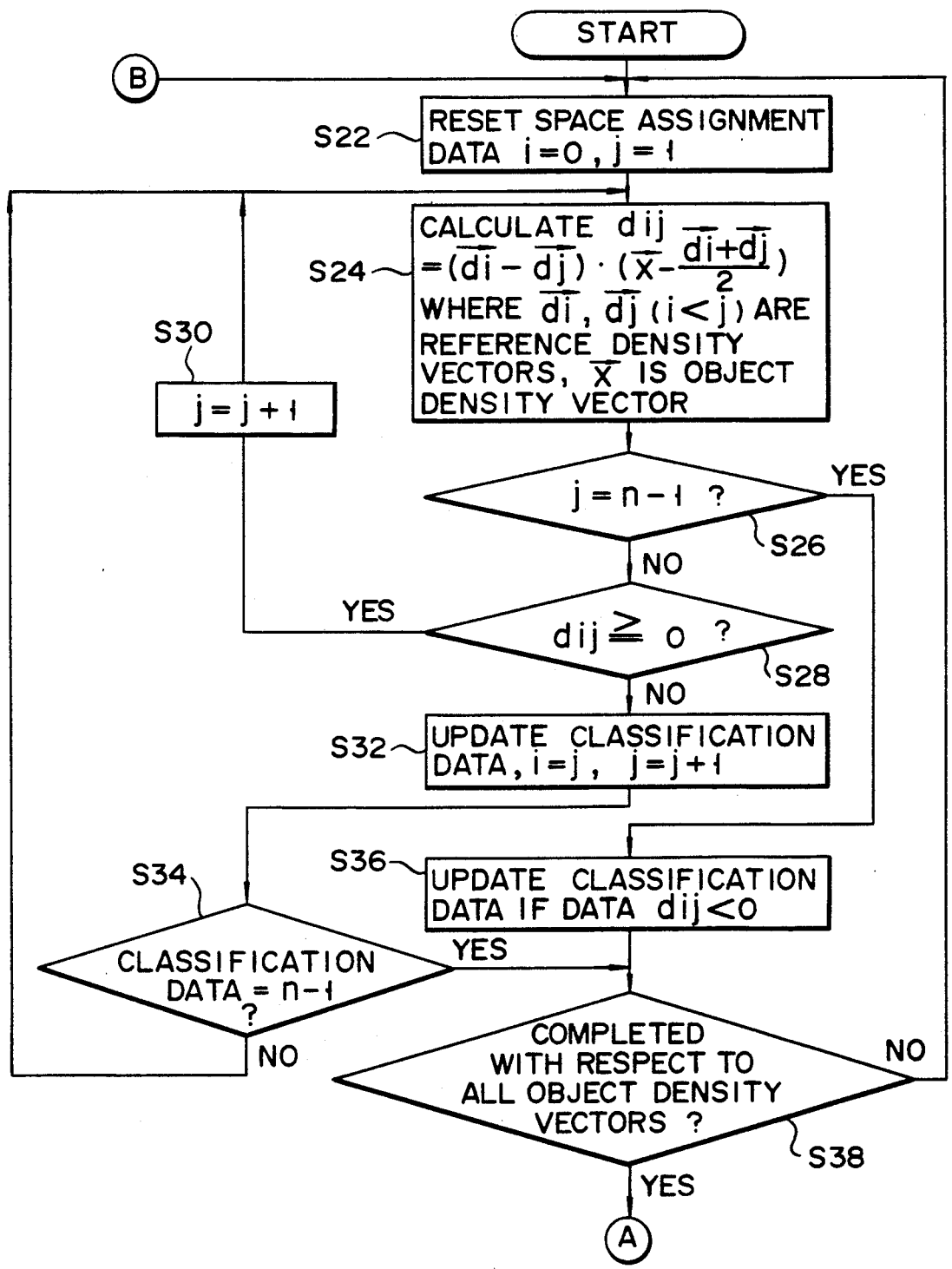
FIG. 12 is a flow chart for explaining the operation of the third embodiment.

The operation of the third embodiment will now be described with reference to FIG. 12. Assume that the number n of reference density vectors is 5.

When a classification command is input, classification data in classification data memory 20' is cleared in step S22. Value i of i register 32 of memory 12' is set to be "0", and value j of j register 33 is set to be "1". A linear combination command is output to linear combination processor 17' through line 32. In response to this command, density vector data x for the first pixel to be classified is read out by processor 17' from R, G, and B memories 14, 15, and 16 respectively through lines 23, 24, and 25 in step S24. Reference density vectors d0 and d1 designated by values i and j are read out from reference density vector storage area 31 of memory 12'. A linear combination operation for calculating value dij is executed using density vector x of the pixel of interest and reference density vectors d0 and d1 in the same manner as in step S2 of the first embodiment. The apparatus then checks if operation result dij is a positive or negative value. By way of example, dij is assumed to be a positive value. The determination result is signaled to CPU 11' through line 32.

The apparatus checks in step S26 if value j is equal to n−1. If Y in step S26, step S36 is executed. If N in step S26, step S28 is executed. Since the number of reference density vectors is 5, N is obtained in step S26, and step S28 is executed. The apparatus checks in step S28 if value dij from processor 17' is a positive or negative value. If value dij is a positive value, step S30 is executed; otherwise, step S32 is executed. In this case, since value dij is a positive value, step S30 is executed to increment the value of j register 43 by one. Therefore, value i is "0" and value j is "2".

Thereafter, step S24 is similarly repeated. Assume that operation result dij is a negative value. Then, N is obtained in step S28 after step S26, and step S32 is executed. In step S32, the value of j register 43 is set in i register 42, and the value of the j register 43 is incremented by one. More specifically, value i is "2", and value j is "3". Classification data, for the corresponding pixel, in classification data memory 20' is updated by CPU 11' in accordance with value i through line 33. Therefore, classification data is updated to be "2".

Thereafter, the apparatus checks in step S34 if the value of classification data is equal to n−1. If Y in step S34, classification processing for the corresponding pixel is completed, and step S38 is executed. In this case, since the classification data is "2", N is obtained in step S34. Step S24 is executed in accordance with values i and j. If result dij of step S24 is a positive value, steps S26, S28, and S30 are executed. Values i and j are updated to be "2" and "4", respectively. Thereafter, step S24 is executed. By way of example, dij is assumed to be a negative value.

Since value j is "4", Y is obtained in step S26, and step S36 is executed. If N in step S26, step S28 is executed. If in step S36 dij has a positive, step S38 is executed. If value dij has a negative, classification data is updated in accordance with value j. That is, a value of classification data is updated to be "4". Thereafter, step S38 is executed.

The apparatus checks in step S38 if classification processing for all the pixels constituting image data as a processing object is completed. If N in step S38, the flow returns to step S22 to process a density vector for the next pixel. If Y in step S38, step S10 and subsequent steps shown in FIG. 4B are executed. After execution of step S14 in FIG. 4B, the flow returns to step S22.

As described above, pixels can be classified using four values of d01, d02, d23, and d24, i.e., four calculations. In the first and second embodiments, all the combinations associated with i and j are considered. When the number of reference density vectors is 5, 5(5−1)/2=10 operations are necessary. Therefore, density data can be classified at a higher speed. In this embodiment, the space assignment data memory and the classification processor can be omitted.

In the above embodiments, area division of color image data has been exemplified. The present invention can be applied to clustering processing for multiple-spectral data of a remote sensing image, a characteristic X-ray image, and the like. The image data has been exemplified in the above embodiment. However, the present invention can be applied to all kinds of feature vectors.

What is claimed is:

1. A method for classifying a plurality of feature data elements into a plurality of classes, each feature data element being represented by an object feature vector in a feature space, comprising the steps of:

storing a plurality of reference feature vectors in a memory, each reference feature vector being predetermined;

dividing said feature space into a plurality of partial feature spaces using said plurality of reference feature vectors in response to a classification command, each partial feature space corresponding to one class of said plurality of classes, each object feature vector being assigned to one of said plurality of partial feature spaces in accordance with components of each object feature vector utilizing the sign of a single polynomial equation to determine which of two reference feature vectors is closer to each object feature vector;

determining an average feature vector from object feature vectors for every partial feature space; and storing each average feature vector as a reference feature vector in said memory and repeating said dividing and assigning step until each average feature vector falls within a predetermined error.

2. A method according to claim 1, wherein said determining step comprises the steps of:

executing histogram operations for every component of assigned object feature vectors; and calculting said average feature vector using equation (1) from calculated histogram operation results;

$$Aqk = (1/Nk) \cdot \sum_{m=0}^{2^n-1} hqk(m) \cdot m \quad (1)$$

where Aqk represents a component along a q axis of said average feature vector of class k, q equals 1 to p, p is a positive integer representing a dimension of each object feature vector, Nk represents a number of object feature vectors classified into class k, m represents a feature amount of one component of each object feature vector, each object feature vector is represented by u-bit data, u is a positive integer, and hgk(m) represents a histogram along said q axis of said average feature vector of class k.

3. A method according to claim 1, wherein said dividing step includes dividing said feature space into said plurality of partial feature spaces by an equidistant plane between two reference feature vectors.

4. A method according to claim 1, wherein said dividing step comprises the steps of:

determining a plurality of assignment data for each object feature vector in response to said classification command, each assignment data comprising a plurality of assignment data portions, each assignment data portion representing which of two reference feature vectors, selected as a combination from said plurality of reference feature vectors, is closer to said object feature vector; and assigning each object feature vector to one of said plurality of partial feature spaces in accordance with assignment data associated with a corresponding object feature vector.

5. A method according to claim 4, wherein said determining said plurality of assignment data step comprises the steps of:
selecting a select object feature vector of said plurality of object feature vectors;
obtaining assignment data associated with said select object feature vector for all combinations of two of said reference feature vectors; and
executing said selecting step and said obtaining step for all remaining object feature vectors.

6. A method according to claim 4, wherein said determining said plurality of assignment data step comprises the steps of:
selecting a selected combination of two reference feature vectors from said plurality of reference feature vectors;
obtaining an assignment data portion associated with said selected combination for all object feature vectors; and
executing said selecting step and said obtaining step for all remaining combinations.

7. A method according to claim 4, wherein said determining said plurality of assignment data step includes determining assignment data for all object feature vectors with respect to combinations of two arbitrarily selected from said plurality of reference feature vectors except for combinations selected in response to said classification command.

8. A method according to claim 4, wherein said determining said plurality of assignment data step includes: calculating dij using equation (2), $$dij = (di-dj)\{x-(di+dj)/2\} \quad (2)$$

where di and dj are two reference feature vectors, and x is said object feature vector; and
determining an assignment data portion for a combination of said two reference feature vectors in accordance with dij.

9. A method according to claim 4, wherein said assigning step comprises the steps of:
referring to a first table in accordance with assignment data to obtain classification data; and
classifying said object feature vector into one of said plurality of partial feature spaces in accordance with said classification data.

10. A method according to claim 1, wherein said dividing step comprises the steps of:
determining an assignment data portion for one object feature vector in response to said classification command, said assignment data portion representing which of two reference feature vectors, selected as a combination from said plurality of reference feature vectors, is closer to said object feature vector;
assigning said object feature vector to one of said plurality of partial feature spaces in accordance with said assignment data portion; and
repeating said determining said assignment data portion step and said assigning step until all combinations are completed or until a last partial feature space of said plurality of partial feature spaces is assigned to said object feature vector.

11. A method according to claim 10, wherein said determining said assignment data portion step includes determining assignment data for all object feature vectors with respect to combinations of two arbitrarily selected from said plurality of reference feature vectors except for combinations selected in response to said classification command.

12. A method according to claim 10, wherein said determining said assignment data portion step includes: calculating dij using equation (3), $$dij = (di-dj)\{x-(di+dj)/2\} \quad (3)$$

where di and dj are two reference feature vectors and x is said object feature vector; and
determining said assignment data portion for a combination of said two reference feature vectors in accordance with dij.

13. A method according to claim 10, wherein said assigning step comprises the steps of:
determining current classification data in accordance with previous classification data and said assignment data portion;
classifying said object feature vector into one of said plurality of partial feature spaces in accordance with said current classification data; and
holding said current classification data as said previous classification data.

14. A method according to claim 13, wherein said determining current classification data step includes:
referring to a second table in accordance with said previous classification data and said assignment data portion to obtain said current classification data.

15. A feature data processing apparatus for classifying object feature vectors representing feature data elements into classes, said feature data processing apparatus comprising:
first memory means for storing a plurality of reference feature vectors which are predetermined;
second memory means for storing said object feature vectors;
assignment data determining means for determining assignment data for each of said object feature vectors in response to an input classification command, said assignment data including a plurality of assignment data portions, each assignment data portion indicating which of two reference feature vectors, selected from said plurality of reference feature vectors, is closer to each of said object feature vectors based on the sign of a single polynomial equation;
classifying means for classifying said object feature vectors into one of said classes in accordance with assignment data associated with said object feature vectors, said classes respectively corresponding to said reference feature vectors; and
average feature vector determining means for determining an average feature vector of object feature vectors of every class.

16. An apparatus according to claim 15, wherein said assignment data determining means comprises:
selecting means for selecting a selected object feature vector from said object feature vectors;
obtaining means for obtaining assignment data associated with said selected object feature vector for all combinations of two of said reference feature vectors; and
executing means for causing said selecting means and said obtaining means to operate on all object feature vectors.

17. An apparatus according to claim 15, wherein said assignment data determining means comprises:

selecting means for selecting a selected combination from combinations of two of said reference feature vectors;

obtaining means for obtaining an assignment data portion associated with said selected combination for all object feature vectors; and executing means for causing said selecting means and said obtaining means to operate on all of said combinations.

18. An apparatus according to claim 15, wherein said assignment data determining means includes means for determining assignment data for each object feature vector with respect to combinations of two reference feature vectors arbitrarily selected from said plurality of reference feature vectors except for combinations selected in response to said classification command.

19. An apparatus according to claim 15, wherein said classifying means comprises means for classifying each object feature vector in accordance with a contents of predetermined portions of said assignment data of said corresponding object feature vector.

20. An apparatus according to claim 15, wherein said classifying means comprises:

reading means for reading a read-out content of an assignment data portion of said corresponding object feature vector;

determining means for determining a current class in accordance with said read-out content and a previous class;

means for repeatedly causing said reading means to operate on a next assignment data portion and said determining means to operate on said current class as said previous class until all contents of said assignment data portions are read-out or until said current class is a last class.

21. An apparatus according to claim 15, wherein said average feature vector determining means comprises:

histogram operation means for executing histogram operations for every component of classified object feature vectors of every class; and calculating means for calculating said average feature vector using equation (1) from calculated histogram operation results;

$$Aqk = (1/Nk) \cdot \sum_{m=0}^{2^n-1} hqk(m) \cdot m \tag{1}$$

where Aqk represents a component along a q axis of said average feature vector of class k, q equals 1 to p, p is a positive integer representing a dimension of each object feature vector, Nk represents a number of object feature vectors classified into class k, m represents a feature amount of one component of each object feature vector, each object feature vector is represented by u-bit data, u is a positive integer, and hgk(m) represents a histogram along said q axis of said average feature vector of class k.

22. An apparatus according to claim 15, wherein said assignment data determining means includes:

means for calculating dij using equation (2), $$dij = (di-dj)\{x-(di+dj)/2\} \tag{2}$$

where di and dj are said two reference feature vectors, and x is an object feature vector; and means for determining said assignment data portion for a combination of said two reference feature vectors in accordance with dij.

23. A method for classifying an object feature vector representing feature data, comprising the steps of:

storing a reference feature vector group including a plurality of reference feature vectors in a memory, each reference feature vector being predetermined;

determining assignment data of said object feature vector for combinations of two reference feature vectors sequentially selected from said memory in response to a classification command to obtain classification data in accordance with said assignment data, said assignment data including a plurality assignment data portions which indicate which of said two reference feature vectors of each combination is closer to said object feature vector based on the sign of a single polynomial equation; and assigning said object feature vector to one of a plurality of categories in accordance with said classification data.

24. A method according to claim 23, wherein said determining assignment data step includes:

calculating dij using equation (1), $$dij = (di-dj)\{x-(di+dj)/2\} \tag{1}$$

where di and dj are said two reference feature vectors selected from said reference feature vector group, and x is said object feature vector; and determining said assignment data portions for a combination of said two reference feature vectors in accordance with dij.

25. A method according to claim 23, wherein said determining assignment data step comprises the steps of:

selecting a selected combination of two reference feature vectors from said reference feature vector group;

obtaining an assignment data portion associated with said selected combination for all of a plurality of object feature vectors; and executing said selecting step and said obtaining step for all remaining combinations.

26. A method according to claim 25, wherein said selecting step selects all combinations of two reference feature vectors from said reference feature vector group except for combinations which have already been selected.

27. A method according to claim 23, wherein obtaining classification data includes:

referring to a first table in accordance with said assignment data to obtain said classification data.

28. A method according to claim 23, wherein obtaining classification data comprises the steps of:

determining a current assignment data portion;

determining current classification data in accordance with previous classification data and said current assignment data portion;

holding said current classification data as said previous classification data; and repeating said determining said current assignment data portion, said determining current classification data, and said holding step until all combinations are completed or until a last class classes is assigned to said object feature vector.

29. A method according to claim 28, wherein said determining current classification data includes:

referring to a second table in accordance with said previous classification data and said assignment data portion to obtain said current classification data.

* * * * *